United States Patent [19]
Ehret et al.

[11] 4,138,079
[45] Feb. 6, 1979

[54] MOTOR SUPPORTING PLATFORM

[75] Inventors: Gordon F. Ehret, Alhambra; William N. Rowley, Palos Verdes Estates, both of Calif.

[73] Assignee: Wylain, Inc., Dallas, Tex.

[21] Appl. No.: 841,386

[22] Filed: Oct. 12, 1977

[51] Int. Cl.² .............................................. F16F 15/00
[52] U.S. Cl. ...................................... 248/558; 248/346; 248/639; 248/671; 248/678
[58] Field of Search ................. 248/19, 23, 74 R, 210, 248/346, 172, 310, 347, 75, 77, 79, 230, 357; 24/135 R

[56] References Cited

U.S. PATENT DOCUMENTS

| 124,108 | 2/1872 | Anderson | 24/135 N |
|---|---|---|---|
| 546,081 | 9/1895 | Reyer | 248/94 |
| 2,003,159 | 5/1935 | Taylor | 248/DIG. 9 |
| 2,538,228 | 1/1951 | Blair | 248/19 |
| 3,387,811 | 6/1968 | Adams | 248/346 |
| 3,414,311 | 12/1968 | Trimboli | 248/210 |
| 3,667,079 | 6/1972 | Huggland | 15/105 |
| 3,819,138 | 6/1974 | Rehkopf et al. | 248/146 |
| 3,951,368 | 4/1976 | Appleton | 248/74 R |
| 4,071,213 | 1/1978 | Dauberger | 248/74 R |

*Primary Examiner*—Robert A. Hafer
*Attorney, Agent, or Firm*—Lane, Aitken & Ziems

[57] ABSTRACT

A platform for supporting a motor-pump combination is molded as a unitary structure and includes a primary support and a detachable secondary support. The primary support includes a supporting surface formed at a first radius, and the secondary support includes a supporting surface formed at a second radius and a cavity adapted to receive the primary support. The platform, which retains the cost advantages attendant to one-step molded structures, may be readily converted from a platform for supporting a motor having a first radius to a platform for supporting a motor having a second radius by detaching the secondary support from the platform and mounting it over the primary support.

7 Claims, 10 Drawing Figures

MOTOR SUPPORTING PLATFORM

BACKGROUND OF THE INVENTION

The present invention relates to platforms for supporting different sized objects, and more particularly, to a platform which may be readily converted from a support for a cylindrical object having a first radius to a support for a cylindrical object having a second radius.

Electric motors and the equipment driven by the motors have typically been mounted on platform-type structures which provide a support surface for both the motor and the equipment. With the advent of structural plastics, it has been possible to mold motor supporting platforms as a unitary structure in a one-step molding operation. As can be readily appreciated, such molded platforms can be manufactured at a sizable cost savings when compared to prior platforms.

A disadvantage associated with molded motor supporting platforms is that they cannot be readily converted from a support for a first size motor to a support for a second size motor. The motor support surface of the platform is established during the molding operation by the mold, and, as such, is limited to supporting motors having dimensions conforming to those of the mold.

SUMMARY OF THE INVENTION

It is therefore an object of the present invention to provide a molded platform for supporting objects, such as cylinders, which can be readily converted from a platform for supporting an object having a first size to a platform for supporting a second object having a second size.

It is another object of the present invention to provide a molded platform for supporting cylindrical objects, such as electric motors, which can be readily converted from a platform for supporting a first cylinder having a first radius to a platform for supporting a second cylinder having a second radius, and which retains the cost savings attendant to molded structures.

Towards the fulfillment of these and other objects, the apparatus of the present invention provides a platform having a base and a primary support extending upwardly from the base. The primary support includes a supporting surface adapted to provide support for a first object having a first size dimension. A secondary support is provided which includes a supporting surface adapted to provide support for a second object having a second size dimension. The secondary support includes a cavity formed therein opening onto an end of the secondary support and adapted to receive the primary support. The platform can be converted from a platform for supporting the first object to a platform for supporting the second object by mounting the secondary support over the primary support.

BRIEF DESCRIPTION OF THE DRAWINGS

The above brief description, as well as further objects, features, and advantages, of the present invention will be more fully appreciated by reference to the following detailed description of presently preferred but nonetheless illustrative embodiments in accordance with the present invention, when taken in connection with the accompanying drawings wherein.

DESCRIPTION OF THE PREFERRED EMBODIMENTS

Figure 1:
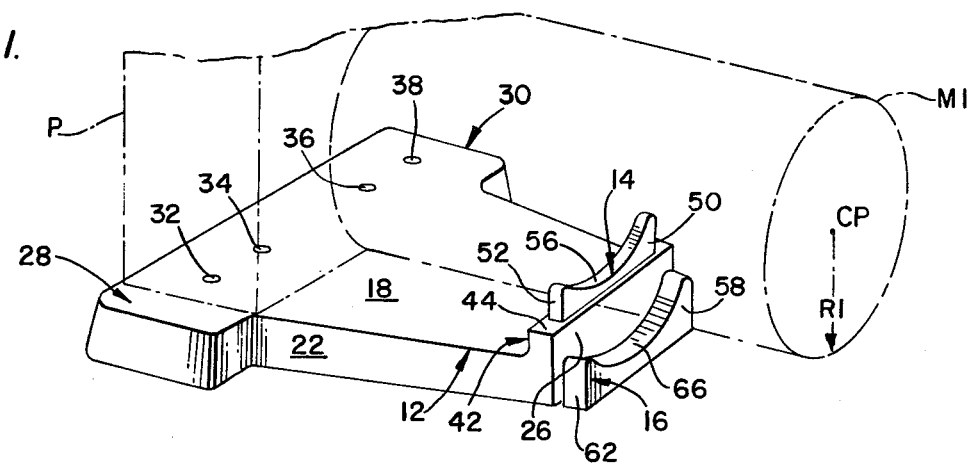
FIG. 1 is a perspective drawing of one embodiment of a platform of the present invention shown supporting an exemplary motor-pump combination depicted in broken line illustration.
Figure 2:
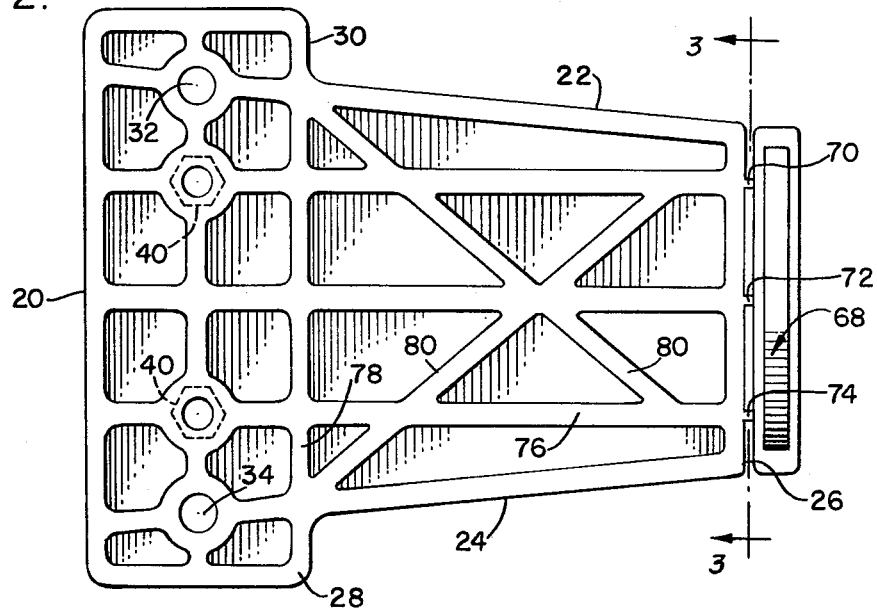
FIG. 2 is a bottom view of the platform of FIG. 1.
Figure 3:
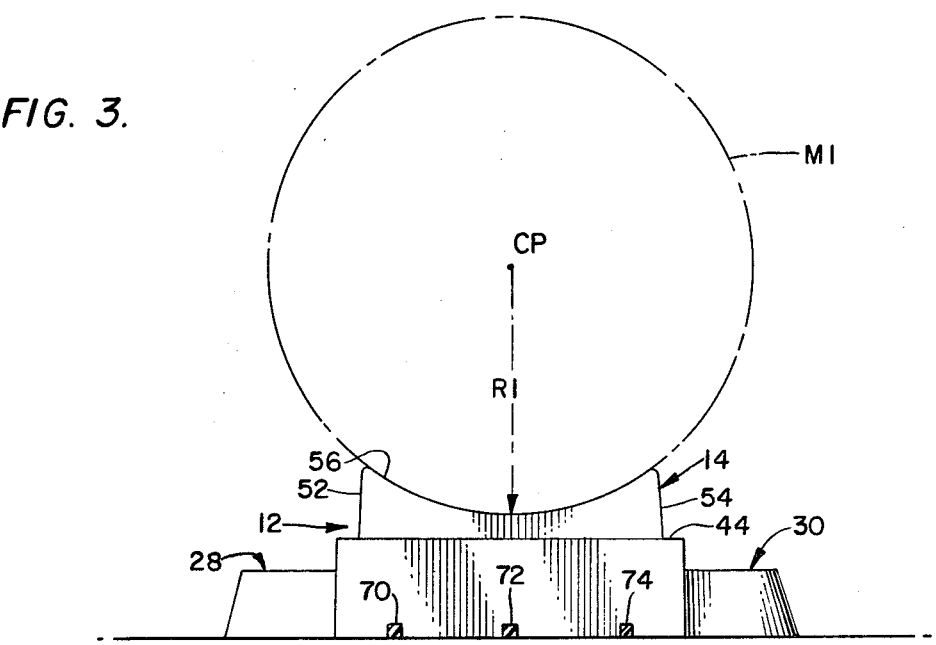
FIG. 3 is a partial cross sectional, rear elevational view taken along line 3—3 of FIG. 2.

Referring to FIG. 1, the reference character 10 refers in general to one embodiment of the platform of the present invention which is shown supporting a motor M1 and a pump P. For reasons of clarity, the motor M1 and the pump P are shown in partial broken line illustration with the motor M1 schematically represented as a cylinder having a radius R1, and the pump P schematically represented as a parallelepiped. The platform 10 includes a base 12, a primary support 14, and a secondary support 16, and is preferably molded as a unitary piece from a structural plastic. As shown in FIGS. 1-3 the base 12 includes a generally planar upper surface 18, a forward wall 20, sidewalls 22 and 24, and a rear wall 26. Extensions 28 and 30 extend laterally outward from the sides 22 and 24 of the base 12 to give the platform 10 its form as shown in FIG. 2. Mounting holes 32, 34, 36 and 38 are provided in the upper surface 18 near the forward end of the base 12. The holes 34 and 36 communicate, respectively, with threaded fasteners 40 (FIG. 2, broken line illustration) and are used in securing equipment, such as the pump P, to the platform 10. The holes 32 and 34 are formed through the base 12 and are used in securing the platform 10 to a floor or other supporting structure.

Figure 4:
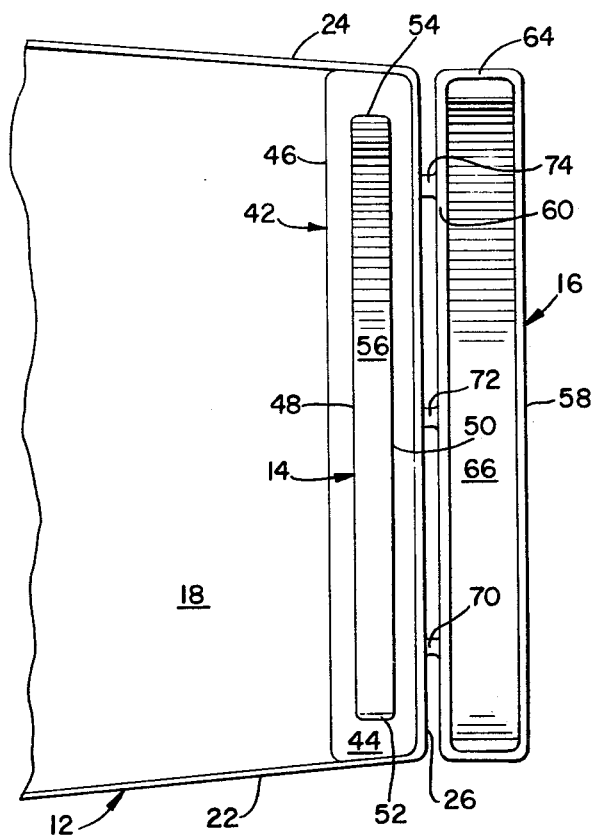
FIG. 4 is a top plan view of the rear portion of the platform shown in FIG. 1.

A pedestal 42 extends across the lateral dimension of the base 12 at the rear portion of the platform 10 and rises upwardly from the base 12 to define a top surface 44. As seen in FIGS. 1 and 4, the pedestal 42 includes a forward facing wall 46, and shares the side walls 22 and 24 and the rear wall 26 of the base 12.

The primary support 14 is disposed upon and rises upwardly from the top surface 44 of the pedestal 42 and includes (FIGS. 1 and 4), a forward wall 48, a rear wall 50 and sidewalls 52 and 54. The upper portion of the primary support 14 has a curved, concave upper support surface 56 (FIGS. 1 and 3), formed at a radius R1 drawn from a point CP, and adapted to support the motor M1.

Referring to FIGS. 1, and 4-6, the secondary support 16 includes a rear wall 58, a forward wall 60, and sidewalls 62 and 64. The upper portion of the secondary support 16 has a curved concave support surface 66. The support surface 66 is adapted to provide support for a second motor M2 having a radius R2 as described below. The secondary support 16 includes a cavity 68

Figure 7:
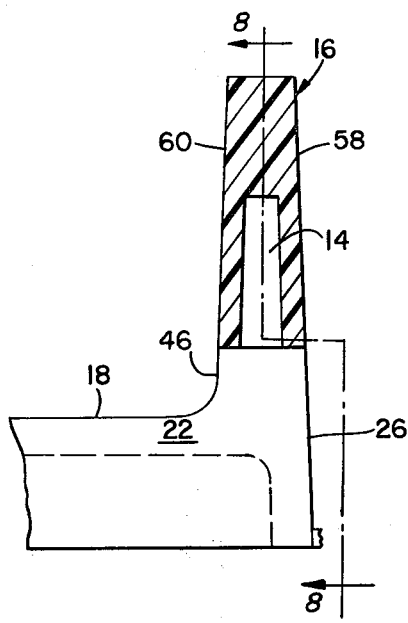
FIG. 7 is an enlarged partial cross sectional view of the secondary support shown in FIGS. 5 and 6 mounted over a primary support.
Figure 5:
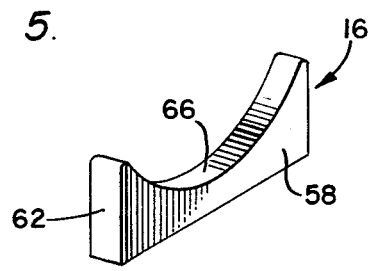
FIG. 5 is a perspective view of a secondary support.
Figure 6:
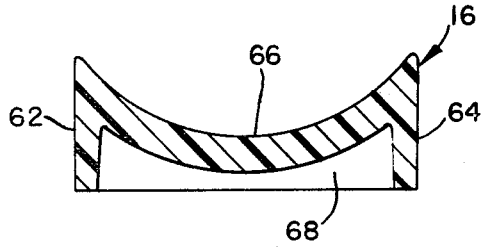
FIG. 6 is a cross sectional, elevational view of the secondary support shown in FIG. 5.

(FIG. 6) formed therein and opening onto the lower end of the secondary support 16. The cavity 68 has the same envelop or shape as the primary support 14 and is adapted to receive the primary support 14 with the walls defining the cavity abutting the aforementioned walls of the primary support 14. As shown in FIGS. 5–7, the cavity and the secondary support surface are substantially coplanar. In the preferred embodiment, the secondary support 16 is molded as a unitary structure with the platform 10 and is connected to the rear wall 26 by three short connections designated herein as gates 70, 72, and 74, and shown in FIGS. 2 and 4.

The underside of the platform 10, shown in FIG. 2, is provided with a plurality of spaced longitudinal ribs 76, spaced lateral ribs 78, and cross ribs 80. The various ribs provide the platform 10 with its load bearing capacity and its structural rigidity.

Figure 8:
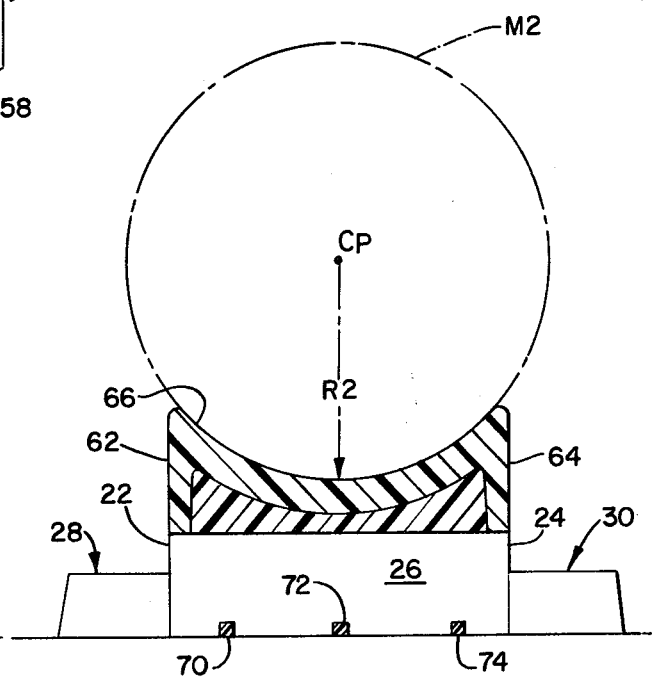
FIG. 8 is a cross sectional view of a portion of the rear of the platform taken along line 8—8 of FIG. 7.

The platform 10 is adapted to provide support for cylindrical objects and may be readily converted from a platform for supporting a cylindrical object having a first radius to a platform for supporting a cylindrical object having a second radius. When it is desired to convert the platform 10 from a platform for supporting the first motor M1, having a radius R1, to a platform for supporting the motor M2, having a radius R2, the secondary support 16 is detached from the rear wall 26 by cutting, breaking, or otherwise severing the gates 70, 72, and 74. The detached secondary support 16 is then fitted over and onto the primary support 14 such that the primary support 14 is received in the cavity 68 of the secondary support 16 as shown in FIGS. 7 and 8. The motor M2 may then be supported on the support surface 66 as shown in FIG. 8. As shown therein the radius R2 of the secondary support surface 66 is defined from the point CP, as is the radius R1 of the primary support surface 56 (FIGS. 1 and 3). When the secondary support is mounted over the primary support, the secondary support surface 66 is disposed above and in vertical registration with the primary support surface 56.

Figure 9:
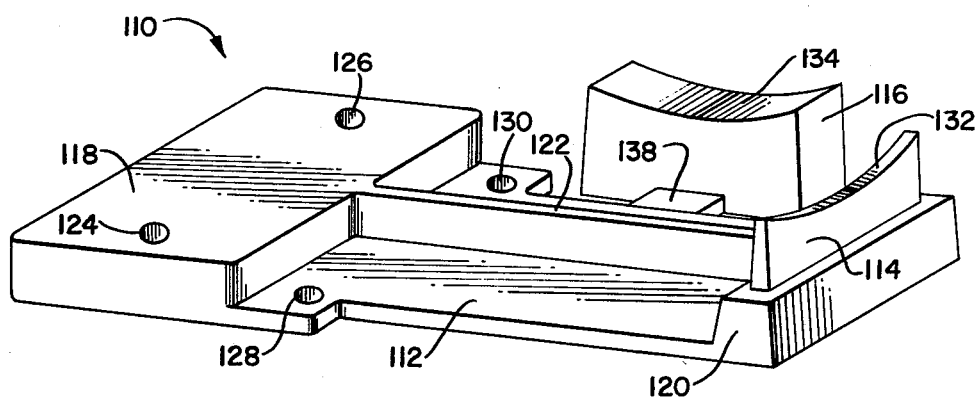
FIG. 9 is a perspective drawing of another embodiment of the present invention.
Figure 10:
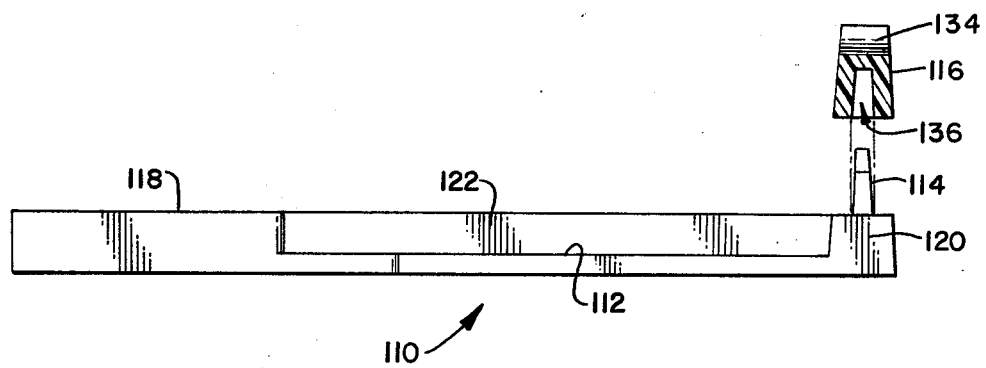
FIG. 10 is a side elevational view of the embodiment shown in FIG. 9 with a secondary support, in cross section, disposed above a primary support.

A second embodiment of the platform of the present invention is shown in FIGS. 9 and 10 and is referred to in general by the reference character 110. The platform 110 includes a base 112, a primary support 114, and a secondary support 116. As in the case of the embodiment of FIGS. 1–8, the platform 110 is preferably molded as a unitary piece from a structural plastic. An equipment mounting pad 118 is formed at the forward end, and a pedestal 120 is formed at the rear end of the platform 110. A rib 122 extends between the pad 118 and the pedestal 120 along the long axis of th platform 110 to provide longitudinal rigidity. The pad 118 has mounting holes 124 and 126 formed therein communicating with threaded fasteners (not shown) embedded in the pad 118. The holes 124 and 126 are used in securing equipment such as a pump, to the platform. The base 112 has through holes 128 and 130 formed therein to aid in securing the platform 110 to a floor or other structure.

The primary support 114 is disposed upon and rises upwardly from the pedestal 120 and includes an upper portion having a curved, concave support surface 132 formed at a first radius to support the motor M1.

The secondary support 116 is formed with an upper portion having a curved, concave support surface 134 formed at a second radius to support the motor M2. The secondary support 116 includes a cavity 136 (FIG. 10) formed therein and opening onto the lower end of the secondary support 116. The cavity 136 has the same general envelop or shape as the primary support 114 and is adapted to receive the primary support 114 with the walls defining the cavity 136 abutting the walls of the primary support 114. The secondary support 116 is molded as a unitary structure with the platform 110 and is connected to an edge of the base 112 by a single gate 138 as shown in FIG. 9.

As in the case of the embodiment of FIGS. 1–8, the platform 110 may be readily converted from a platform for supporting a cylindrical object having a first radius to a platform for supporting a cylindrical object having a second radius by detaching the secondary support 116 from the platform 110 and fitting it over the primary support 114.

Both embodiments of the present invention thus provide a platform which may be molded as a unitary structure in a one-step molding operation from structural plastic. The platform retains the cost savings associated with one-step molded platforms and yet may be converted to provide support for one of a plurality of different sized objects.

Although in the embodiments described above, the supporting surface of the primary and secondary support have been illustrated as concave, curved surfaces for supporting cylindrical electric motor bodies, it is understood that the present invention is not limited to the support of cylindrical bodies and may be adapted to support structures having other, non-cylindrical forms.

As is apparent to those skilled in the art, various changes and modifications may be made to the platform without departing from the spirit and scope of the present invention as recited in the appended claims and their legal equivalent.

What is claimed is:

1. A platform adapted to provide support for one of a plurality of objects of different sizes comprising:
    a base having a primary support extending upwardly therefrom; said primary support having a supporting surface thereon adapted to support a first object having a first size; and at least one secondary support having a supporting surface thereon adapted to support a second object having a second size and having a cavity formed therein adapted to receive said primary support; said cavity and said support surface of said secondary support being formed substantially co-planar with one another;
    said platform being convertible from supporting said first object on said support surface of said primary support to supporting said second object on said supporting surface of said secondary support by mounting said secondary support over said primary support with said cavity receiving said primary support; said support surface of said secondary support disposed above and in vertical alignment with said support surface of said primary support when said secondary support is mounted over said primary support.

2. The platform claimed in claim 1, wherein:
    said supporting surface of said primary support is formed at a first radius and is adapted to support a first cylindrical object having said first radius dimension; and
    said supporting surface of said secondary support is formed at a second radius and is adapted to support a second cylindrical object having said second radius dimension.

3. The platform claimed in claim 1, wherein said platform, said primary support, said secondary support, are molded as a unitary structure from a structural plastic.

4. The platform claimed in claim 1, wherein said secondary support is detachably attached to said platform.

5. The platform claimed in claim 1, wherein said base further comprises:
   a forward wall, a rear wall, and first and second side walls supporting a planar upper surface.

6. A platform for mounting a motor driven component and one of a plurality of motors having different sizes for driving connection to said component:
   a base having a longitudinally extending axis and a portion thereof upon which a motor driven component may be mounted;
   a primary support extending upwardly from said base having a support surface thereon adapted to support a first motor having a first size for driving connection to said component, said support surface of said primary support being formed at a first radius defined from a point;
   at least one secondary support having a support surface thereon adapted to support a second motor having a second size and having a cavity formed therein adapted to receive said primary support, said secondary support adapted to be fitted over and upon said primary support with said cavity receiving said primary support, said support surface of said secondary support being formed, when said secondary support is mounted over said primary support, at a second radius defined from said point from which said first radius is defined.

7. The platform claimed in claim 6 wherein:
said second radius is smaller than said first radius.

* * * * *